(12) United States Patent
Webb et al.

(10) Patent No.: US 7,823,932 B2
(45) Date of Patent: Nov. 2, 2010

(54) PRESS FITTING ARRANGEMENT WITH A PRE-PRESS LEAK INDICATOR SEALING RING

(75) Inventors: Steven Paul Webb, Tipton (GB); Alan Richard Glaze, Bromsgrove (GB)

(73) Assignee: IBP Conex Limited, Tipton (GB)

(*) Notice: Subject to any disclaimer, the term of this patent is extended or adjusted under 35 U.S.C. 154(b) by 261 days.

(21) Appl. No.: 11/737,429

(22) Filed: Apr. 19, 2007

(65) Prior Publication Data

US 2007/0246938 A1   Oct. 25, 2007

(30) Foreign Application Priority Data

Apr. 19, 2006   (EP)  .................................. 06008083

(51) Int. Cl.
*F16L 17/00* (2006.01)
(52) U.S. Cl. ........................ 285/374; 285/345; 285/349; 285/382; 285/382.2
(58) Field of Classification Search ................. 285/245, 285/374, 382, 382.2, 345, 349
See application file for complete search history.

(56) References Cited

U.S. PATENT DOCUMENTS

| | | | | |
|---|---|---|---|---|
| 2,410,786 A | * | 11/1946 | Mallory | ...................... 285/260 |
| 3,315,970 A | * | 4/1967 | Holoway | ..................... 277/615 |
| 3,539,205 A | * | 11/1970 | Johnson, Jr. et al. | ........... 285/5 |
| 4,275,909 A | * | 6/1981 | Yoshizawa et al. | .......... 285/110 |
| 5,007,667 A | * | 4/1991 | Unewisse et al. | ........ 285/382.2 |
| 6,260,891 B1 | * | 7/2001 | Foering et al. | ........... 285/382.2 |
| 7,475,918 B2 | * | 1/2009 | Kaimer et al. | ........... 285/382.2 |
| 2006/0175829 A1 | | 8/2006 | Kaimer | |

FOREIGN PATENT DOCUMENTS

DE        19722935 C1  *  7/1998
DE        298 13 935 U1    11/1998

(Continued)

OTHER PUBLICATIONS

Knutsen et al, "Symmetry activates extrastriate visual cortex in human and nonhuman primates", Feb. 22, 2005, The National Acedemy of Sciences, accessed from web site "http://www.ncbi.nlm.nih.gov/pmc/articles/PMC549500/" on Nov. 17, 2009, pp. 1-2 of 14.*

*Primary Examiner*—James M Hewitt
*Assistant Examiner*—Jay R Ripley
(74) *Attorney, Agent, or Firm*—Christensen O'Connor Johnson Kindness PLLC (57) ABSTRACT

A press fitting arrangement includes a sealing ring to be housed within a bead of a press fitting into which a tube is to be inserted. There is at least one gap between the press fitting together with the sealing ring and the tube which is closed by pressing at least one portion of the press fitting. The sealing ring has at least one first portion along the majority of its circumference. Each first portion of the sealing ring has an outside diameter (SOD1) prior to fitment into the press fitting bead which is larger than the inside bead diameter (BID) and an inside diameter (SID1) prior to the insertion of the tube which is less than the tube outside diameter (TOD). Additionally, the sealing ring has at least one pair of diametrically opposing second portions, each second portion of the sealing ring comprising a recess between the two projections.

12 Claims, 6 Drawing Sheets

FOREIGN PATENT DOCUMENTS

| | | |
|---|---|---|
| DE | 101 18 955 C2 | 10/2002 |
| DE | 10164568 C1 * | 6/2003 |
| EP | 0 985 113 B1 | 3/2000 |
| EP | 1 249 655 A1 | 10/2002 |
| JP | 08226582 A * | 9/1996 |
| WO | 2004/068018 A1 | 8/2001 |

* cited by examiner

PRESS FITTING ARRANGEMENT WITH A PRE-PRESS LEAK INDICATOR SEALING RING

BACKGROUND

Figure 9A:
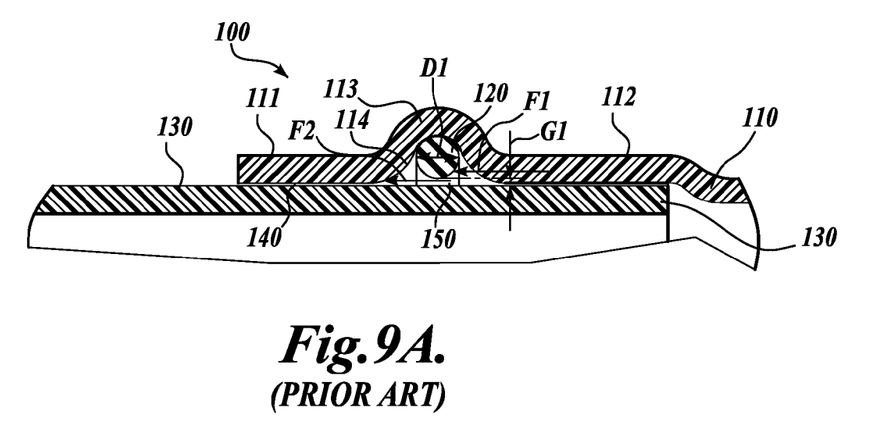
FIGS. 9a and 9b are cross-sections of known press fitting arrangements.
Figure 9B:
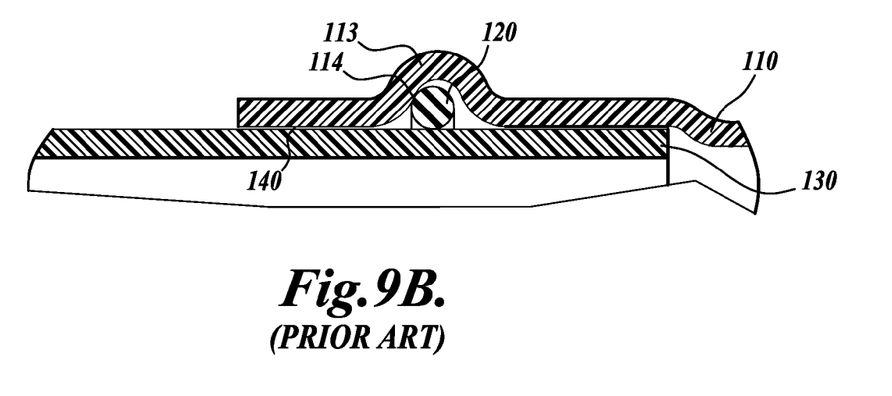

Pre-press leak indicator sealing rings for press fitting arrangements are largely known in the prior art. One example of such a known sealing ring is shown in FIGS. 9a and 9b. As illustrated, a press fitting arrangement 100 comprises a press fitting 110, a sealing ring 120 and a tube 130 with a gap 140 being provided between the press fitting 110 together with the sealing ring 120 and the tube 130 to allow a fluid flow 150 from the inside of the tube 130 to the outside of the press fitting arrangement 100. The press fitting 110 is provided with two cylindrical portions 111, 112 between which a bead 113 is arranged in order to house the sealing ring 120, with the bead 113 being provided with a flank 114 facing the free end of the press fitting 110.

The gap 140 is provided between the sealing ring 120 and the tube 130 in the region of the bead 113 due to choosing the cross-section of the sealing ring 120, that is the cross-section perpendicular to the direction of the fluid flow 150, to be substantially circular with a sealing ring diameter D1 being smaller than the difference between the inside bead diameter and the outside tube diameter. In usage, prior to applying a pressing action in order to obtain a fluid tight connection between the press fitting 110 and the tube 130, a fluid flow force F1 acting on the sealing ring 120 can exceed the force F2 of the fluid flow 150 within the gap 140, see FIG. 9a, such that the sealing ring 120 will move towards the flank 114 of the bead 113 which will result in a downward movement of the sealing ring 120 reducing the gap height G1 until the gap 140 and, thus, the leak path of the press fitting arrangement 100 is closed as shown in FIG. 9b.

A structure as discussed with respect to FIGS. 9a and 9b is in particular known from DE 101 18 955 C2.

It is also known to increase the gap height G1 in an arrangement discussed with respect to FIGS. 9a and 9b in order to avoid a pre-press closure of the leakage path by, e.g., modulating the sealing ring contour as, for example, disclosed in WO 2004/068018 A1, DE 298 13 935 U1, EP 0 985 113 B1 or JP 08226582 A. The sealing ring known from JP 08226582 A has an outer diameter made substantially equal to an inside diameter of the bottom of a bead of a press fitting within which the sealing ring is housed and an inside diameter made substantially equal to an outside diameter of a tube inserted within the press fitting. In addition, the known sealing ring is provided with a recess defining a fluid flow passage between the sealing ring and the bottom of the bead on the one hand and between the sealing ring and the outer surface of the tube on the other hand, and two projections bordering said recess, each with two substantially triangular extended portions engaging in both side edges of the bead in order to inhibit the displacement of the sealing ring and, thus, the flow passages prior to applying a pressing action.

Further developments of known press fitting arrangements, and in particular sealing rings therefor, are desired in order to ensure the pre-press leak indicator function.

SUMMARY

As one example of the present invention, disclosed herein is a press fitting arrangement with a pre-press leak indicator sealing ring. In particular, disclosed is a sealing ring that is to be housed within a bead of a press fitting into which a tube is to be inserted. The sealing ring provides the press fitting arrangement with at least one gap between the press fitting together with the sealing ring and the tube. The gap is closed by applying a pressing action to at least one portion of the press fitting for providing a non-removable sealed connection between the tube and the press fitting. The sealing ring has at least one first portion along the majority of its circumference that is defined by a substantially circular cross-section with a diameter D1. The gap is determined by a second portion of the sealing ring having a cross-section which deviates from said substantially circular cross-section of the first portion by providing at least one recess oriented at least towards the inserted tube and at least one projection.

Each first portion of the sealing ring has an outside diameter SOD1 prior to fitment into the press fitting bead which is larger than the inside bead diameter BID, and an inside diameter SID1 prior to the insertion of the tube which is less than the tube outside diameter TOD. The sealing ring has at least one pair of diametrically opposing second portions, and each second portion of the sealing ring comprises one recess between two projections. The transition between each recess and its adjacent projections is preferably smooth.

The volume of the recess of each second portion which is missing from the cross-section compared to each first portion is larger than the volume of the respective two adjacent projections of said second portion which is added to the cross-section compared to each first portion. Further, each recess on the inside diameter of the sealing ring is preferably provided by a reduction of the sealing ring cord section extending between the two adjacent projections.

Some embodiments of the invention are further characterized in that the cord section reduction extends radially and symmetrically around a centre, preferably with a substantially circular cross-section, most preferably with an angle A1 of around 2° to around 40° along the inner circumference of the sealing ring and/or up to 180° around the non-circular sealing ring cross-section of each second portion.

It is further preferred, though not required, that each projection has a trilobal structure. This trilobal structure can be further characterized in that the cross-section of the trilobal structure is defined by three circle points around which three circles are arranged to provide two extended portions defined by two circles with substantially equal radii R1 and one flat portion between said extended portions facing the tube in the press fitting arrangement, as well as one enhanced portion between said extended portions facing the press fitting in the press fitting arrangement defined by the third circle with a radius R2.

It is possible that the height H1 of the trilobal structure between the flat and the enhanced portions is such that the deviation DD1 and DD2 from the diameter D1 is, on both sealing ring sides, in each second portion substantially equal.

It is also proposed that R2 is chosen to provide an interference with a bead inside diameter radius in the press fitting arrangement.

Advantageously, R1 and the distance between the respective circle points may be chosen to provide the extended portions with the function of centralizing the gap within the bead of the press fitting arrangement without impeding the insertion of the tube.

It also proposed that an angle A2 is defined by the extension of the two extended portions, together with the flat portion along the circumference of each sealing ring projection, and is chosen to assist in maintaining the gap between a sealing ring housing flank of the press fitting bead and the centre of the adjacent recess and/or to allow insertion of the sealing ring in differently shaped and dimensioned beads.

A pre-press leak indicator system as described herein utilizes a sealing ring which has two opposing features, each with one recess bordered by two projections to define a leak path. The features are deliberately opposite each other to ensure that any eccentricity within a press fitting arrangement in the pre-press condition does not reduce or totally negate the leak path.

In addition, prior to fitment, the sealing ring outside diameter is larger than the inside diameter of the sealing ring housing bead inducing an outwardly acting radial force when the sealing ring is inserted into the bead, which results in a resistance of a sealing ring displacement during a tube insertion. The same force also resists the tendency of closure of the leak path due to the phenomena that occurs when the pressure acting on the sealing ring surface exceeds that present in the leak path and discussed with reference to FIGS. 9a and 9b. Also, at that chosen outside diameter of the sealing ring in its free state, the volume of the sealing ring is such that when pressing occurs, a subsequent reduction of diameter and consequential circumferential reduction ensures sufficient volume displacement to cause a swelling of the reduced sections of the sealing ring, namely in the region of the two opposing recesses.

In its fitted state, the sealing ring internal diameter is for the majority of its circumference, in first portions, less than the tube outer diameter in order to ensure a degree of interference such that, upon tube insertion, the sealing element will remain in its chosen position both axially and radially.

Accordingly, the dimensioning of the sealing ring first portions helps maintain the position of the sealing ring and the leak paths in the press fitting arrangement, despite the necessity of inserting the tube after arranging the sealing ring within the bead of a press fitting and possible fluid flow force differences.

In order to avoid a closure of the leak paths between the press fitting and the sealing ring arranged therein on the one hand and the tube inserted into the press fitting on the other hand prior to obtaining a non-removable press fitting arrangement due to the application of a pressing action, the recesses of the sealing ring in the second portions are provided in the region of the inner diameter of the sealing ring. In addition, when force is applied via the action of fluid pressure against the sealing ring surface, the tendency to cause a seal, as described with reference to FIGS. 9a and 9b, is prevented not only by the provision of said recesses in the second portions as well as the projections bordering said recesses but also due to the compressed state of the sealing ring in its first portions.

In an embodiment, the geometry of each projection preferably is trilobal in order to provide in particular two extended portions interfering with the bead in order to centralize the leak feature within the press fitting arrangement and avoiding an interference with the tube when being inserted into the press fitting already housing the sealing ring in order to obtain the press fitting arrangement. The extended portions are also provided such that sufficient material is given to close the leakage paths when applying a pressing action to the press fitting in order to obtain a fluid tight press fitting connection.

In order to avoid a prevention of a volume replacement or as a worse condition a folding of the material of the projections when applying a pressing action, each recess arranged between two projections extends preferably from 2° to 40° along the circumference of the sealing ring without inhibiting a closure of the leakage path. Such a closure is achieved a. o. by sealing ring material migrating circumferentially when applying a pressing action such that the circumferential migration of the material results in an expansion of the sealing ring in the area of said recesses. As an addition to this volume displacement, the trilobal features of the sealing ring of the present invention assist the same function.

DESCRIPTION OF THE DRAWINGS

Embodiments of the invention will now be described by way of example with reference to the accompanying drawings of which:

FIGS. 6a to 6h are different views of the press fitting arrangement with the projections of the sealing ring having been omitted in order to enhance clarity, with FIG. 6a showing a cross-section in the region of the two recesses of the sealing ring, FIG. 6b showing a side view of the press fitting arrangement of FIG. 6a, FIG. 6c showing a cross-section along the line A-A of FIG. 6b, FIG. 6d being an enlargement from FIG. 6c, FIG. 6e showing a cross-section along the line B-B of FIG. 6b, FIGS. 6f and 6g being enlargements from FIG. 6e and FIG. 6h showing an enlargement of FIG. 6a;

DETAILED DESCRIPTION

Figure 1:
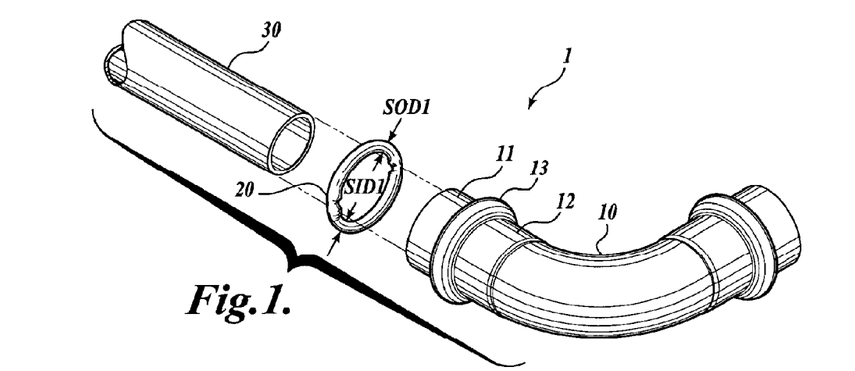
FIG. 1 is an exploded perspective view of a press fitting arrangement.
Figures 2A, 2B, 2C:
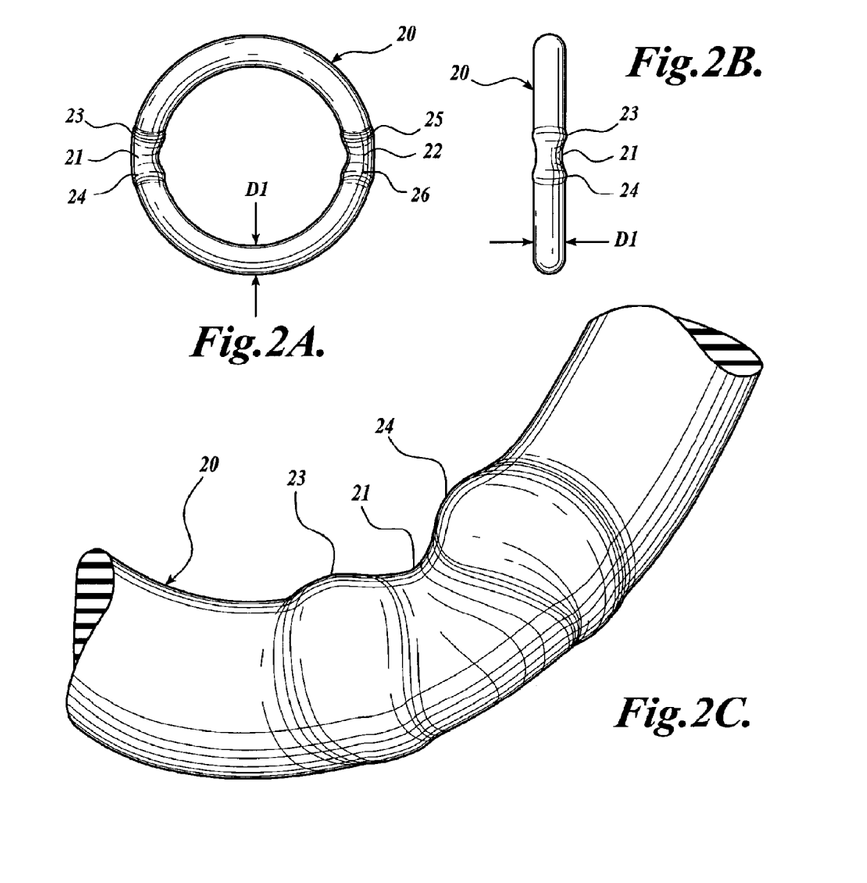
FIGS. 2a to 2c are different views of the sealing ring to be used in the press fitting arrangement of FIG. 1.

As can be seen from FIG. 1, a press fitting arrangement 1 comprises a press fitting 10, a sealing ring 20 and a tube 30, with the press fitting 10 being provided with two cylindrical portions 11, 12 on both sides of a bead 13 provided for housing the sealing ring 20. In particular, in FIGS. 2a to 2c, the geometry of the sealing ring 20 is depicted with two diametrically opposing recesses 21, 22 both bordered by two trilobal projections 23 to 26. The sealing ring 20 has along the majority of its circumference a cross-section perpendicular to a fluid flow direction within the tube 30 in the form of a circle with a diameter D1, defining two first portions of the sealing ring 20 between which two second portions are arranged each having a cross-section deviating from the form of a circle by the provision of the recesses 21, 22 as well as projections 23 to 26.

Figure 3:
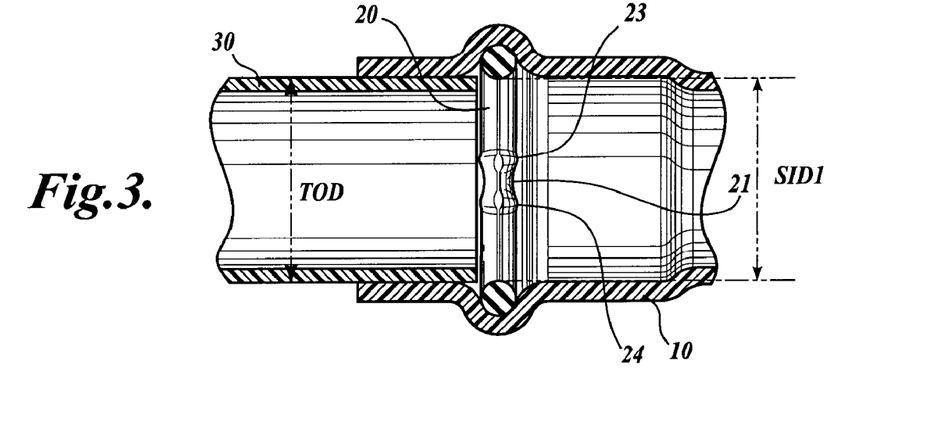
FIG. 3 is a cross section depicting the press fitting arrangement of FIG. 1 prior to complete insertion of a tube.
Figure 4:
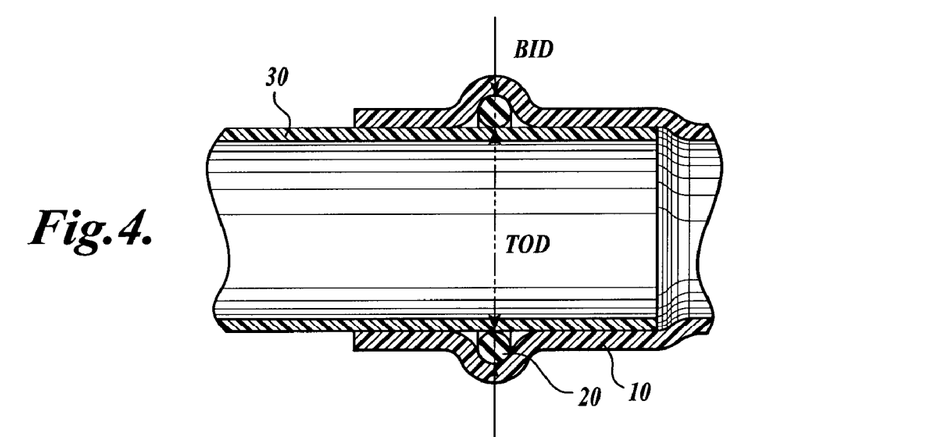
FIG. 4 is a cross-section as shown in FIG. 3 after insertion of the tube.

In order to avoid a displacement of the sealing ring 20 when arranged within the press fitting 10 during insertion of the tube 30, see FIG. 3, the sealing ring 20 is in its first portions dimensioned such that the sealing ring outside diameter SOD1, see FIG. 1, is larger than the inside bead diameter BID, see FIG. 4. In order to centralize the sealing ring 20 within the press fitting arrangement 1 as soon as the tube 30 has been inserted, see FIG. 4, the first portions are also provided with a sealing ring inner diameter SID1 being less than the tube outer diameter TOD. Accordingly, the sealing ring 20 will be compressed in its first portions as soon as fitted within a press fitting arrangement 1 in order to remain in its chosen position both axially and radially.

Figure 5:
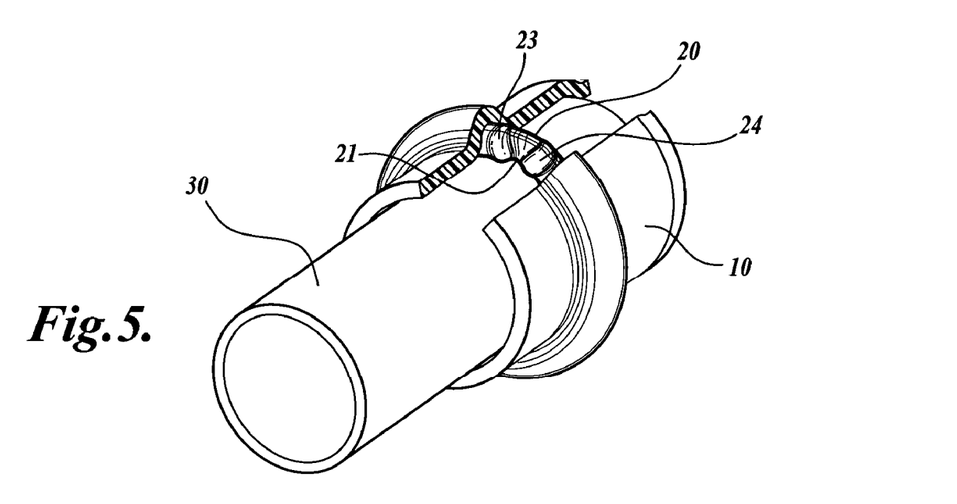
FIG. 5 is a perspective view of the press fitting arrangement of FIG. 1 with a part of the press fitting being cut away.

In order to better understand the structure of the second portions, see FIG. 5, a sealing ring structure having the projections 23 to 26 omitted is discussed with reference to FIGS. 6a to 7b. In particular, said figures show a sealing ring 20' with its two recesses 21', 22' ensuring two opposing gaps 40a, 40b between the tube 30 and the press fitting 10 with the sealing ring 20' in order to allow a fluid flow from the inside of the tube 30 to the outside of the press fitting arrangement.

Figure 6A:
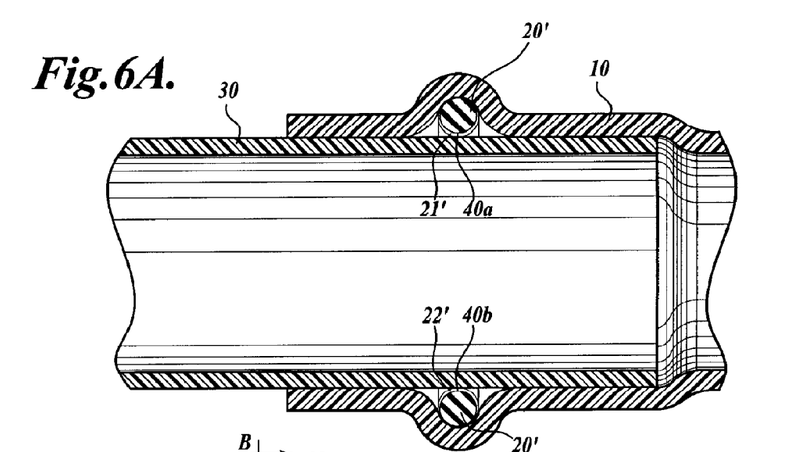
Figure 6B:
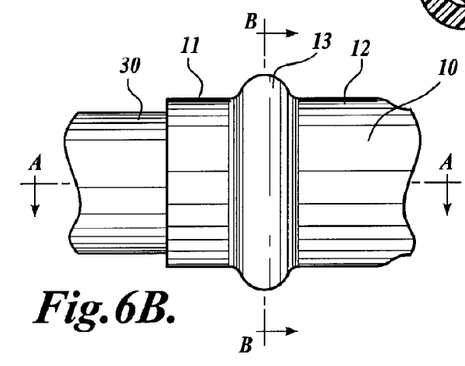
Figure 6C:
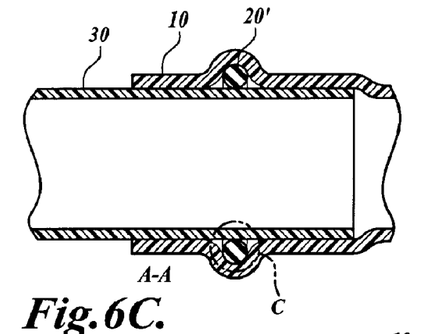
Figures 6D, 6G:
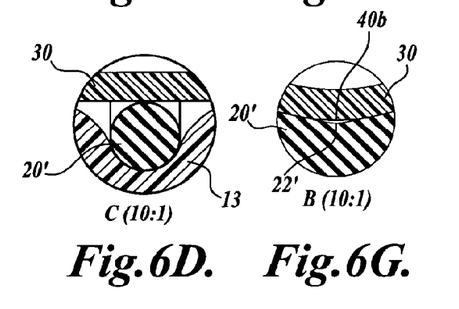
Figures 6E, 6F:
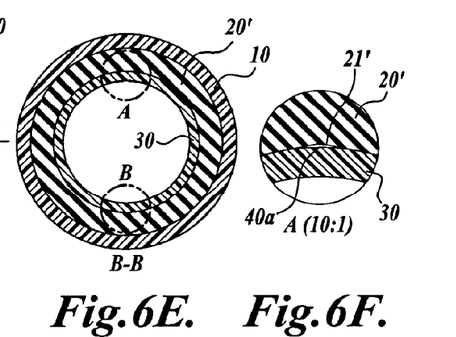

From the illustration of FIG. 6a, it can be realized that if there is eccentricity of components of the press fitting arrangement, the leak path will be decreased on one side, for example, due to reduction of the gap 40a, but increased on the diametrically opposing side, for example, due to an enlargement of the gap 40b, thereby ensuring pre-press leaking. This is further illustrated in FIGS. 6e to 6g, whereas from FIGS. 6c and 6d it can be seen that the compressed first portions of the sealing ring 20' lead to fixing the placement of the sealing ring 20' within the bead 13 of the press fitting 10 as best shown in FIG. 6b.

Figure 6H:
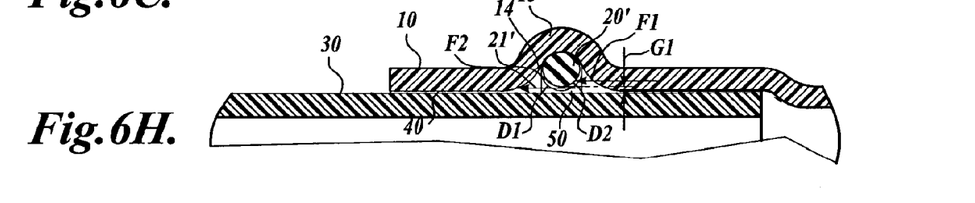

FIG. 6h illustrates the ability of the press fitting arrangement 1 to resist a low pressure sealing phenomenon. That is, when a force F1 is applied via the action of a fluid pressure against the surface of the sealing ring 20' which is larger than a fluid flow force F2 within the gap 40, the tendency to cause a seal (e.g., as described with reference to FIGS. 9a and 9b for the prior art), despite the fact that the sealing ring cross section D2 in region of the recess 21' is smaller than the distance between the bead inner diameter BID and the tube outer diameter TOD, is prevented by the adjacent diameter D1 already being in a compressed state against both a flank 14 of the bead 13 and the tube 30 such that the majority of the sealing ring 20' cannot move.

The adjacent major sealing ring cord diameters D1 either side of the central reduced section with the diameter D2 are at a distance from said reduced section that will not easily allow axial deflection of the sealing ring cord section. Consequently, contact between the sealing ring 20' with its reduced diameter D1 and the flank 14 of the bead 13 concurrently with contact with the tube 30 is avoided such that a fluid flow 50 is maintained.

Figure 7A:
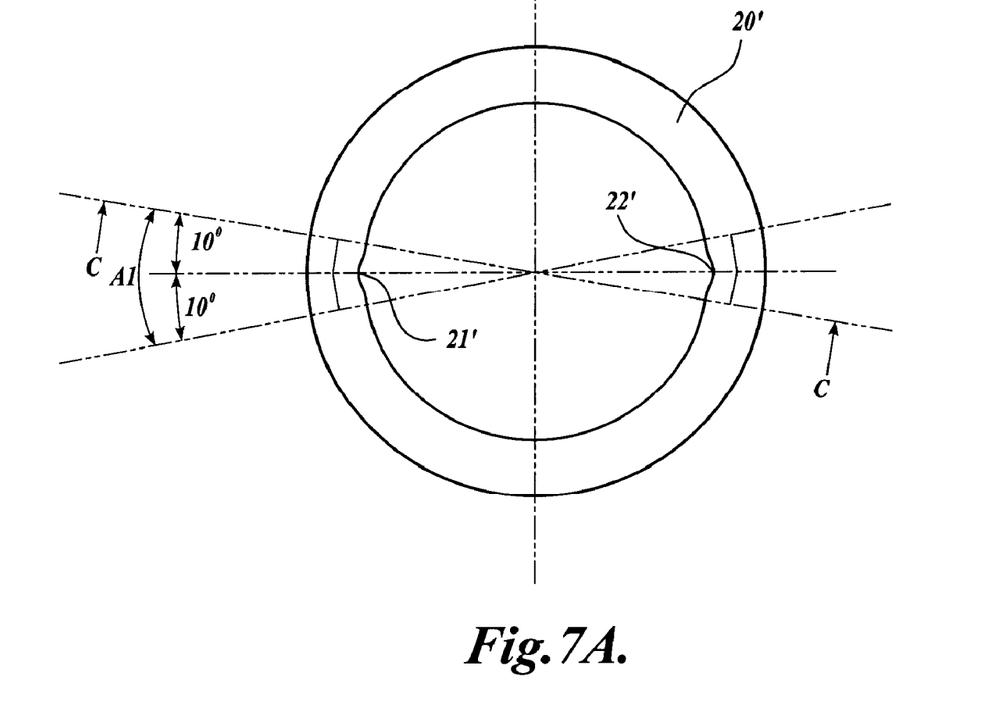
FIGS. 7a and 7b are views of the sealing ring with the projections having been omitted, with FIG. 7a being a side view and FIG. 7b being a perspective view.
Figure 7B:
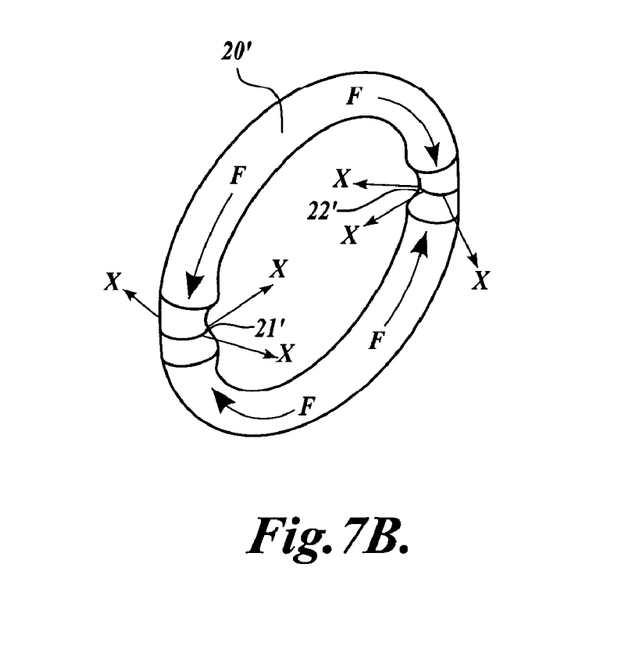

From FIG. 7a, it can be obtained that the reduction of the cord section of the sealing ring 20' takes place in the area of the recesses 21' and 22', each with an extension, e.g. 10°, of either side of the centre of the respective recess. In this example, the complete angle A1 of 20° for each recess 21', 22' is chosen to ensure that the reduction of the major sealing ring cord diameter D1 to the central reduced diameter D2 does not create a condition where the degree of taper would cause too severe a transition which may prevent the volume replacement or as a worse condition folding of the material occurring. Thus, the sealing ring 20' is to utilize its circumferential reduction when applying a pressing action on the press fitting 10 to encourage the replacement of removed material by sealing ring material which migrates during said pressing action as can be best explained with reference to FIG. 7b. FIG. 7b depicts material migration directions F resulting in an expansion of the reduced cord sections 21', 22' radially as indicated by arrows X.

In addition to the just described feature effecting volume displacement of sealing ring material, the trilobal feature of the projections 23 to 26 assists the same function with the additional material of the projections 23 to 26 being slightly less than the material removed in the area of the recesses 21 and 22.

Figure 8A:
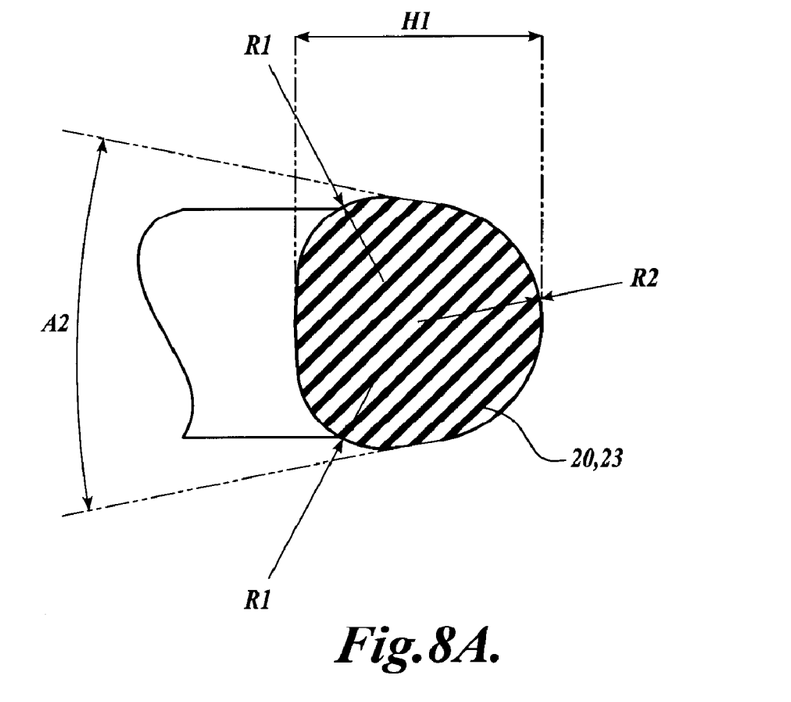
FIGS. 8a and 8b are cross-sections of the sealing ring of FIGS. 2a to 2c in the region of one of its projections.
Figure 8B:
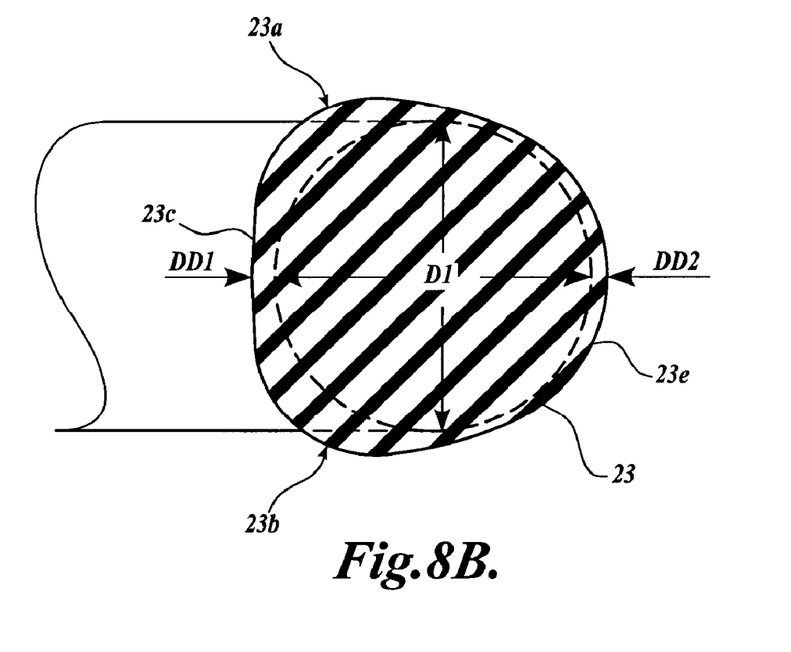

The trilobal structure will be further discussed with reference to FIGS. 8a and 8b which show in further detail one projection 23 of the sealing ring 20 in cross-section with its three circle points defining three circles, two of which having a radius R1 and one of which having a radius R2, such that two extended portions 23a, 23b, one flat portion 23c and one enhanced portion 23e are provided. The two extended portions 23a, 23b provide material for some migration on applying a pressing action to the press fitting arrangement without interfering with the insertion of a tube by selecting the radius R1 and the displacement of the respective two circles with the radius R1. The flat portion 23c is provided facing the tube 30 whereas the enhanced portion 23e is arranged towards the bead 13 of the press fitting 10. The height H1 of each projection between the tube 30 and the press fitting bead 13 is selected such that the additional material exceeding the circular cross-section of the first portions with the diameter D1 leads to a diameter difference compared to the diameter D1 of DD1 in the region of the flat portion 23c and DD2 in the region of the enhanced portion 23e corresponding to each other. The radius R2 is chosen to provide some interference with the bead 13 of the press fitting 10 in order to further fix the arrangement of the sealing ring 20 within said bead 13.

In this example, the angle A2 defining the extension of the extended portions 23a, 23b and the flat portion 23c is chosen to provide sufficient material projection to assist in maintaining a leak path between the sealing ring housing flank 13 and the central diameter D2 of the reduced section 21 and to allow insertion of the sealing ring 20 in differently dimensioned beads.

It can be summarized that during a pressing operation, some migration of material from the trilobal sections 23 to 26 to the corresponding reduced section 21 or 22 will occur assisted by the blended transition of surfaces between the aforementioned sections.

In some embodiments, the press fitting arrangement 1 described herein is particularly suited for press fitting bodies in sizes ranging from 12 to 54 mm diameter.

The features disclosed in the foregoing description, or the following claims, or the accompanying drawings, expressed in their specific forms or in terms of means for performing the disclosed function, or a method or process for attaining the disclosed result, as appropriate, may, separately or in any combination of said features, be utilized for realizing the invention in diverse forms thereof.

REFERENCE SIGNS LIST 1 press fitting arrangement
10 press fitting
11 cylindrical portion
12 cylindrical portion
13 bead
14 flank
20, 20' sealing ring
21, 21' recess
22, 22' recess
23 projection
24 projection
25 projection
26 projection
23a, 23b extended portion
23e flat portion
23f enhanced portion
30 tube
40 gap
50 fluid flow
100 press fitting arrangement
110 press fitting
111 cylindrical portion 112 cylindrical portion
113 bead
114 flank
120 sealing ring
130 tube
140 gap
150 fluid flow
A1 angle
A2 angle
BID bead inner diameter
D1 sealing ring diameter
D2 sealing ring diameter
DD1 sealing ring diameter difference
DD2 sealing ring diameter difference
F material migration force
F1 fluid flow force
F2 fluid flow force
G1 gap height
H1 sealing ring height
R1 sealing ring radius
R2 sealing ring radius
SID1 sealing ring inner diameter
SOD1 sealing ring outer diameter
TOD tube outer diameter
X expansion direction The embodiments of the invention in which an exclusive property or privilege is claimed are defined as follows:

1. A press fitting arrangement, comprising:
   a tube;
   a press fitting having a bead; and
   a sealing ring, the sealing ring having first portions and second portions, wherein the first portions in combination extend along a majority of the sealing ring circumference,
   wherein, prior to housing the sealing ring within the bead of the press fitting and before insertion of the tube into the press fitting, the first portions have an essentially circular cross-section with a diameter (D1), each of the first portions having an outer surface defining an outside diameter (SOD1) of the sealing ring that is greater than an inside diameter (BID) of the bead, and each of the second portions comprises a recess oriented toward an inside of the sealing ring with two projections bordering the recess, wherein each recess is defined by a sealing ring cord section that has a cross-sectional diameter that deviates from the cross-sectional diameter (D1) of the first portions,
   wherein the recess of each second portion has a volume that is defined between the two projections bordering the recess, said volume created by a deviation of the cross-section of the second portion from the essentially circular cross-section of the first portions having the cross-sectional diameter (D1), and wherein the volume of the recess is larger than a total volume of the two projections bordering the recess, wherein the total volume of the two projections bordering the recess is defined by material of the sealing ring having a cross-section that deviates from the essentially circular cross-section of the first portions having the cross-sectional diameter (D1),
   wherein after the sealing ring is housed within the bead of the press fitting and prior to insertion of the tube into the press fitting, each of the first portions further has an inner surface defining an inside diameter (SID1) of the sealing ring that is less than an outside diameter (TOD) of the tube, and
   wherein the sealing ring is dimensioned such that when the tube is inserted into the press fitting, the first portions of the sealing ring housed within the bead of the press fitting are compressed such that the sealing ring remains within the bead and the recess in each of the second portions of the sealing ring provides a gap between the press fitting and the tube, wherein each gap is closable by application of a pressing action to at least one portion of the press fitting which causes a migration of sealing ring material into the sealing ring cord section, said migration of sealing ring material resulting in an expansion of the sealing ring cord section that closes the gap.

2. The press fitting arrangement according to claim 1, wherein a transition between each recess and the projections bordering the recess is smooth.

3. The press fitting arrangement according to claim 1, wherein the recess on the inside of each second portion of the sealing ring is provided by a reduction in diameter of the sealing ring.

4. The press fitting arrangement according to claim 3, wherein the reduction extends radially and symmetrically along the sealing ring around a center of the recess with an angle (A1) of around 2 degrees to around 40 degrees along an inner circumference of the sealing ring.

5. The press fitting arrangement according to claim 1, wherein each of the projections bordering the recess of each of the second portions of the sealing ring has a trilobal structure.

6. The press fitting arrangement according to claim 5, wherein a cross-section of each trilobal projection is defined by three circle points around which three circles are arranged to provide two extended portions defined by two of the three circles with substantially equal radii (R1) and one flat portion between said extended portions, the flat portion being on an inside of the sealing ring so as to face the tube inserted in the press fitting arrangement as well as one enhanced portion between said extended portions facing the press fitting in the press fitting arrangement defined by a third circle of the three circles with a radius (R2).

7. The press fitting arrangement according to claim 6, wherein a height (H1) of the trilobal structure between the flat and the enhanced portions is such that a first deviation (DD1) from the diameter (D1) of the first portion on the inside diameter of the sealing ring and a second deviation (DD2) from the diameter (D1) of the first portion on an outside of the sealing ring facing the press fitting are substantially equal.

8. The press fitting arrangement according to claim 6, wherein the radius (R2) of the third of the three circles is sized such that an interference with an inside radius of the press fitting bead is provided.

9. The press fitting arrangement according to claim 6, wherein the radius (R1) of the two of the three circles with substantially equal radii and the distance between the respective circle points of the two circles are sized such that they provide the extended portions with the function of centralizing the gap within the bead of the press fitting arrangement without impeding the insertion of the tube.

10. The press fitting arrangement according to claim 6, wherein an angle (A2) is defined by the extension of the two extended portions together with the flat portion along the circumference of each projection, and an amount of material provided by the two extended portions and corresponding to the angle (A2) is sufficient to allow insertion of the sealing ring in differently shaped and dimensioned beads.

11. The press fitting arrangement according to claim 1, wherein the press fitting is provided with cylindrical portions on both sides of the bead in an axial direction.

12. A press fitting arrangement, comprising:
    a tube;

a press fitting having a bead; and a sealing ring, the sealing ring having first portions and second portions, wherein the first portions in combination extend along a majority of the sealing ring circumference, wherein, prior to housing the sealing ring within the bead of the press fitting and before insertion of the tube into the press fitting, the first portions have an essentially circular cross-section with a diameter (D1), each of the first portions having an outer surface defining an outside diameter (SOD1) of the sealing ring that is greater than an inside diameter (BID) of the bead, and each of the second portions comprises a recess oriented toward an inside of the sealing ring with two projections bordering the recess, wherein each projection bordering the recess of one of the second portions of the sealing ring has a trilobal structure, and wherein each recess is defined by a sealing ring cord section that has a cross-sectional diameter that deviates from the cross-sectional diameter (D1) of the first portions, wherein the recess of each second portion has a volume that is defined between the two projections bordering the recess, said volume created by a deviation of the cross-section of the second portion from the essentially circular cross-section of the first portions having the cross-sectional diameter (D1), and wherein the volume of the recess is larger than a total volume of the two projections bordering the recess, wherein the total volume of the two projections bordering the recess is defined by material of the sealing ring having a cross-section that deviates from the essentially circular cross-section of the first portions having the cross-sectional diameter (D1), wherein after the sealing ring is housed within the bead of the press fitting and prior to insertion of the tube into the press fitting, each of the first portions further has an inner surface defining an inside diameter (SID1) of the sealing ring that is less than an outside diameter (TOD) of the tube, wherein the sealing ring is dimensioned such that, when the tube is inserted into the press fitting, the first portions of the sealing ring housed within the bead of the press fitting are compressed such that the sealing ring remains within the bead and the recess in each of the second portions of the sealing ring provides a gap between the press fitting and the tube, wherein each gap is closable by application of a pressing action to at least one portion of the press fitting which causes a migration of sealing ring material into the sealing ring cord section, said migration of sealing ring material resulting in an expansion of the sealing ring cord section that closes the gap, and wherein a cross-section of the trilobal structure of each projection bordering each recess is defined by three circle points around which three circles are arranged to provide two extended portions defined by two of the three circles with substantially equal radii (R1) and one flat portion between said extended portions, the flat portion being on an inside of the sealing ring so as to face the tube inserted in the press fitting as well as one enhanced portion between said extended portions facing the press fitting defined by a third circle of the three circles with a radius (R2).

* * * * *